United States Patent [19]

Hort

[11] 3,872,100

[45] Mar. 18, 1975

[54] PROCESS FOR THE PREPARATION OF 1,3-BIS(2-PYRROLIDONYL) BUTANE

[75] Inventor: Eugene V. Hort, Piscataway, N.J.

[73] Assignee: GAF Corporation, New York, N.Y.

[22] Filed: Sept. 15, 1972

[21] Appl. No.: 289,412

Related U.S. Application Data

[62] Division of Ser. No. 172,198, Aug. 16, 1971, Pat. No. 3,772,186.

[52] U.S. Cl. .......................................... 260/326.25
[51] Int. Cl. ............................................ C07d 27/08
[58] Field of Search ............................... 260/326.25

[56] References Cited
OTHER PUBLICATIONS

Breitenbach et al., Chem. Abst., Vol. 51, 4355-4357 (1957), abs. of Monatsh, 87, 580-592.

*Primary Examiner*—Joseph A. Narcavage
*Attorney, Agent, or Firm*—Walter C. Kehm; Samson B. Leavitt; Joshua J. Ward

[57] ABSTRACT

Process for the preparation of 1,3-bis(2-pyrrolidonyl) butane is provided comprising heating 1,3-bis(2-pyrrolidonyl)-1-butene to a temperature above the melting point thereof under hydrogen pressure in the presence of a hydrogenation catalyst for a sufficient period of time to substantially hydrogenate the 1,3-bis(2-pyrrolidonyl)-1-butene and thereafter, recovering the hydrogenated product.

Process is also provided for separating aromatic hydrocarbons from mixtures of aromatic/non-aromatic hydrocarbons comprising contacting a mixture of aromatic/non-aromatic hydrocarbons with 1,3-bis(2-pyrrolidonyl)butane to form an aromatic hydrocarbon-rich extract phase and a raffinate phase, separating the aromatic hydrocarbon-rich extract phase from the mixture, and recovering the aromatic hydrocarbon from said extract phase.

4 Claims, No Drawings

PROCESS FOR THE PREPARATION OF 1,3-BIS(2-PYRROLIDONYL) BUTANE

This is a division of application Ser. No. 172,198 filed Aug. 16, 1971, now U.S. Pat. No. 3,772,186.

This invention relates to processes for the hydrogenation of vinyl pyrrolidone dimer and to the use of the hydrogenated dimer as a selective solvent for recovery of aromatic hydrocarbons. More particularly, this invention relates to processes for the preparation of 1,3-bis(2-pyrrolidonyl)butane by hydrogenation of 1,3-bis(2-pyrrolidonyl)-1-butene and to the use of the hydrogenated dimer as a selective solvent in separating aromatic hydrocarbons from aromatic/non-aromatic hydrocarbon mixtures.

1,3-bis(2-pyrrolidonyl)butane has heretofore been obtained by the hydrogenation of 1,3-bis(2-pyrrolidonyl)-1-butene (see, for example, J. W. Breitenbach, et al., Monatsh. 87, 580–592 (1956)). This prior procedure involved the hydrogenation of a dilute solution of 1,3-bis(2-pyrrolidonyl)-1-butene in acetic acid at a low temperature in the presence of a noble metal catalyst. The hydrogenated dimer has also been prepared by reduction of 1,3-bis(2-pyrrolidonyl)-1-butene with lithium aluminum hydride. Although these prior processes are useful for the preparation of the hydrogenated dimer, it would be desirable to provide processes for the preparation of the hydrogenated dimer wherein no solvent is employed thereby eliminating both the cost and potential contamination inherent with the use of the solvent. Moreover, the recovery of the hydrogenated dimer is thereby simplified to mere separation from the catalyst as, for example, by filtration. Still further, it would be highly desirable to provide a hydrogenation process wherein the hydrogenated dimer could be obtained in high yield and purity thereby avoiding complicated and expensive separation techniques required for isolation of the hydrogenated product.

In another embodiment of the present invention, it has been found that the hydrogenated dimer provides a highly selective solvent for the extraction of aromatic hydrocarbons from aromatic/non-aromatic mixtures. For example, the hydrogenated vinyl pyrrolidone dimer has been found highly efficient in extracting aromatics such as benzene, toluene, xylene, ethyl benzene and the like from hydrocarbon mixtures such as reformed gasoline, hydrogenated pyrolysis gasoline, oil gasification and coke oven mixtures by a liquid/liquid extraction process with a high degree of selectivity.

Accordingly, it is an object of the present invention to provide a process for the preparation of 1,3-bis(2-pyrrolidonyl) butane by hydrogenation of 1,3-bis(2-pyrrolidonyl)-1-butene.

It is another object of the present invention to provide a hydrogenated vinyl pyrrolidone dimer in high yield and purity.

It is still another object of the present invention to provide a solvent-free process for the preparation of vinyl pyrrolidone dimer.

It is a still further object of the present invention to provide hydrogenated vinyl pyrrolidone dimer as a highly selective aromatic extraction solvent.

It is yet another object of the present invention to provide a highly selective liquid/liquid extraction process for separating aromatic hydrocarbons from mixtures of aromatic/non-aromatic hydrocarbons employing 1,3-bis(2-pyrrolidonyl)butane.

These as well as other objects are accomplished by the present invention which, in one embodiment, provides a process for the preparation of 1,3-bis(2-pyrrolidonyl)butane comprising contacting 1,3-bis(2-pyrrolidonyl)-1-butene at a temperature above the melting point thereof under hydrogen pressure in the presence of a hydrogenation catalyst for a sufficient period of time to hydrogenate 1,3-bis(2-pyrrolidonyl)-1-butene and thereafter recovering the hydrogenated product.

In an alternate embodiment of the present invention, a method is provided for separating aromatic hydrocarbons from mixtures of aromatic/non-aromatic hydrocarbons comprising contacting a mixture of aromatic/non-aromatic hydrocarbons with 1,3-bis(2-pyrrolidonyl)butane to form an aromatic hydrocarbon-rich extract phase and a raffinate phase, separating the aromatic hydrocarbon-rich extract phase from the mixture and recovering the aromatic hydrocarbon from said extract phase.

The vinyl pyrrolidone dimer, 1,3-bis(2-pyrrolidonyl)-1-butene, employed as the starting material in the present invention can be prepared by treating a small amount of N-vinyl pyrrolidone at room temperature with anhydrous hydrogen chloride gas. An improved process for preparing the vinyl pyrrolidone dimer in higher yields and purity as well as lighter color is described in applicant's co-pending patent application U.S. Ser. No. 172,311, filed Aug. 16, 1971 entitled "Process for the Dimerization of Vinyl Pyrrolidone" and assigned to the same assignee as herein. This improved process involves heating N-vinyl pyrrolidone at temperatures ranging from about 60° to about 150°C. in the presence of a catalytic amount of an aqueous acid, maintaining the reaction temperature in said range throughout the course of the reaction and thereafter, recovering the vinyl pyrrolidone dimer.

The vinyl pyrrolidone dimer can be hydrogenated in accordance with the present invention by being charged to a suitable hydrogenation reaction vessel such as an autoclave or rocker bomb after the reaction vessel has been purged with an inert gas such as nitrogen. The catalyst is also charged to the reactor. The vinyl pyrrolidone dimer is then heated to a temperature sufficient to render the dimer in a molten condition. Generally, depending upon the purity of the dimer, it will melt at temperatures ranging from 60°C. to about 78°C. Since the reaction is conducted at temperatures which are high enough to melt the vinyl pyrrolidone dimer, there is no need in the present invention to employ a solvent. It is well known that solvents have a profound effect upon the rate and yield of catalytic hydrogenations, and even upon whether or not a particular product is obtained. An unexpected result of this invention is that the hydrogenation, carried out in the absence of a solvent, gives a high rate of reaction and a quantitative yield of product, with little evidence of catalyst poisoning.

Although the vinyl pyrrolidone dimer melts at relatively low temperature, it is considered preferable to employ higher temperatures since higher reaction rates are thus obtained enabling the use of less active catalysts. Preferably, the reaction is conducted at temperatures ranging from about 80°C. to about 150°C. although higher or lower temperatures can be employed if desired. At temperatures above about 160°C., however, the vinyl pyrrolidone dimer will gradually decompose to yield undesirable by-products.

Any conventional hydrogenation catalyst can be employed. The hydrogenation catalysts employed in the present invention are well known in the art and are disclosed along with suitable methods for their preparation in numerous patents and other publications. Typical of the hydrogenation catalyst which can be employed in the present invention are nickel, platinum, rhodium, ruthenium, cobalt, copper-chromate, rhenium and the like, whether supported or unsupported. Although any catalyst known to promote the hydrogenation of olefinic double bonds can be employed, catalysts based on nickel are preferred for use in the present invention, since they are not only generally lower in cost, but also give a far lighter colored product as compared to most of the other catalysts which can be employed. Typical nickel catalysts which can be employed are, for example, skeletal (Raney) nickel, and nickel on various supports such as silica, alumina, kieselguhr and the like. These catalysts can also contain other metals as promotors, such as copper, manganese, zirconium and noble metals. The amount of catalyst employed can vary widely depending upon the activity of the catalyst and the nature of the reactor employed, for example, less than 1% by weight of the catalyst based on the weight of vinyl pyrrolidone dimer can be employed when a noble metal catalyst is used in a stirred reactor. Large amounts of catalyst are employed, for example, about 10% by weight based on the weight of vinyl pyrrolidone dimer in fixed beds for use in a flow reactor. Thus, depending upon the activity of the catalyst and the type of reactor employed, the amount of catalyst can range from about 0.1% to about 10% by weight based on the weight of the vinyl pyrrolidone dimer.

Although the order of addition is not considered important, it is considered preferable to charge the vinyl pyrrolidone dimer and catalyst to the reaction vessel and then to purge the reaction vessel with an inert gas such as nitrogen and finally with hydrogen prior to heating the reactants to the reaction temperature. Once the vinyl pyrrolidone dimer is liquified and the desired reaction temperature is obtained, hydrogen can be charged to the reaction vessel at pressures generally ranging from about 100 to about 5,000 psig. depending upon the particular catalyst employed, for example, lower hydrogen pressures can be employed with noble metal catalysts whereas intermediate hydrogen pressures can be employed with active nickel catalysts and generally higher hydrogen pressures can be employed when using relatively inactive nickel or cobalt catalysts.

The hydrogenation reaction of the present invention can either be conducted on a continuous or batch basis using stirred sump reactors, packed towers, autoclaves, rocker bombs and the like. The recovery of the hydrogenated vinyl pyrrolidone dimer is quite convenient since no solvent is employed in the process of the present invention. Upon completion of the reaction, the unreacted hydrogen can be vented and recycled for subsequent use and the reaction mixture can be filtered to separate the reaction product from the catalyst. The hydrogenation reaction of the present invention gives an essentially quantitative conversion of vinyl pyrrolidone dimer to 1,3-bis(2-pyrrolidonyl)butane. For example, a crude dimer of 85% purity gives a product assaying about 85% of the hydrogenated dimer.

The hydrogenated vinyl pyrrolidone dimer obtained in accordance with the present invention is useful as an extremely high boiling and stable solvent of the aprotic hydrogen bonding type. Because of its high stability and low vapor pressure, it can be suitably employed as a solvent for gases such as carbon dioxide, sulfur dioxide and hydrogen sulfide. It can also be employed as a selective solvent for the extraction of hydrocarbons such as acetylenes, olefins and aromatics. The hydrogenated vinyl pyrrolidone dimer can also be employed as a coalescing agent for latex films, as a leveling and dye stripping agent for dyeing and as a solvent for a variety of chemicals and polymers.

Although the hydrogenated vinyl pyrrolidone dimer can be used in a wide variety of applications, it has been found to be especially useful as a selective solvent for the extraction of aromatic hydrocarbons from mixtures of aromatic/non-aromatic hydrocarbons with a surprisingly high selectivity for said aromatic hydrocarbons.

In liquid/liquid extraction processes, selectivity, which in this instance, is the ratio of extracted aromatics to extracted non-aromatics, is a critical performance factor which, in a continuous commercial process, is more important than the total extraction.

In the liquid/liquid extraction process, the hydrocarbon mixture of aromatic hydrocarbons and non-aromatic hydrocarbons must be brought into good contact with the hydrogenated vinyl pyrrolidone dimer to permit mass transfer of the aromatic hydrocarbon into the hydrogenated vinyl pyrrolidone dimer stream and thereafter the dimer stream must be separated from the hydrocarbon mixture. Generally, a quantity of the feed liquid is admixed with a quantity of the hydrogenated vinyl pyrrolidone solvent in an agitated vessel, after which the layers are allowed to settle and separate into an extract phase and a raffinate phase. This gives about one theoretical contact, which is adequate in simple extractions. The operation can of course be repeated if more than one contact is required. When the quantities involved are large and several contacts are needed, continuous flow becomes economical. Most commercial extraction equipment is continuous, with either successive stage contacts or differential contacts. Representative types are mixersettlers, vertical towers of various kinds which operate by gravity flow, agitated tower extractors and centrifugal extractors.

For batchwise extraction, the mixer and settler can be the same unit. A tank containing a turbine or propeller agitator is most common. At the end of the mixing cycle, the agitator is shut off, the layers allowed to separate by gravity, and extract and raffinate drawn off to separate receivers through a bottom drain line. The mixing and settling times required for a given extraction can vary widely, for example, 5 minutes for mixing and 20 minutes for settling are typical, but both shorter and much longer times are common.

For continuous flow, the mixer and settler are generally separate pieces of equipment. The mixer can be a small agitator tank provided with inlets and a drawoff line and baffles to prevent short-circuiting; or maybe a centrifugal pump or other flow mixer. The settler is often a simple continuous decanter. With liquids which emulsify easily and which have nearly the same density, it may be necessary to pass the effluent from the mixer through a screen or pad of glass fiber to coalesce the droplets of the dispersed phase before gravity settling is feasible. If, as is usual, several contact stages are required, a train of mixer-settlers can be operated with counter-current flow. The raffinate from each settler becomes the feed to the next mixer, where it meets intermediate extract or fresh solvent.

Generally, the aromatic/non-aromatic hydrocarbon mixtures from which the aromatic hydrocarbons are extracted in accordance with the present invention are mixtures such as reformed gasoline, hydrogenated pyrolysis gasoline, oil gasification and coke oven products. Aromatics such as benzene, toluene, xylene, ethyl benzene and the like are contained in these mixtures together with aliphatic hydrocarbons both saturated and unsaturated such as n-butane, isobutane, n-hexane, butene-1, butene-2, amylenes and the like.

The aromatic/non-aromatic hydrocarbons are brought into intimate contact with the hydrogenated vinyl pyrrolidone dimer, 1,3-bis(2-pyrrolidonyl)butane in a mixing zone, preferably an intensive mixing zone wherein the two streams undergo high shear agitation. Intimate contact between the two streams is necessary in order to effect a high degree of mass transfer between the hydrocarbon stream and the hydrogenated vinyl pyrrolidone dimer. The period of intensive mixing will vary widely depending upon the nature of the hydrocarbon stream and the particular mixing equipment employed. Generally, sufficient mixing is permitted to ensure effective contact of the extraction solvent with the bulk of the hydrocarbon stream.

After intensive mixing, the resulting mixture is allowed to settle into a two phase system comprising an aromatic-rich extract phase and a raffinate phase. The extract and raffinate phases are then separated by decantation or other conventional separation techniques for separating immiscible phases. The aromatic hydrocarbons are recovered from the extract phase generally by distillation and the extract solvent comprising primarily the hydrogenated vinyl pyrrolidone dimer can be recycled to the extraction process.

It has been found advantageous to incorporate relatively small amounts of water in the extraction solvent. Thus, the use of from about 1% to about 10% by weight of water in combination with the extraction solvent has been found effective in enhancing selectivity for the separation of aromatic hydrocarbons from mixtures with non-aromatic hydrocarbons.

The following examples further define, describe and compare methods of preparing the hydrogenated vinyl pyrrolidone dimer and of utilizing said hydrogenated dimer as a selective extraction solvent for the extraction of aromatic hydrocarbons from mixtures of aromatic/non-aromatic hydrocarbons. All parts and percentages are by weight unless otherwise indicated.

EXAMPLE 1

Into a 1 gallon stainless steel stirred hydrogenation autoclave was charged 2,000 gms. of vinyl pyrrolidone dimer (1,3-bis(2-pyrrolidonyl)-1-butene) which was analyzed by gas chromatography to be 93% pure and 40 gms. of 62.5% nickel-on-kieselguhr catalyst. After purging the autoclave with nitrogen and hydrogen, the reaction mixture was heated to a 120°C. and 300 psig. of hydrogen was admitted. Hydrogen was consumed at 120°C. and 300 psig. over an 8 hour period. After a total of 12 hours, the autoclave was allowed to cool, unreacted hydrogen was vented when the autoclave was purged with nitrogen and then discharged. The product separated by filtration from the catalyst on a suction funnel. A pale yellow liquid was obtained which assayed 93% vinyl pyrrolidone dimer, 1,3-bis(2-pyrrolidonyl)butane, by gas chromatography.

EXAMPLE 2

The catalyst recovered from Example 1 was charged to a one gallon stainless steel stirred hydrogenation autoclave together with a fresh 2,000 gms. aliquot of the vinyl pyrrolidone dimer. Hydrogenation was effected as described in Example 1 and required 9 hours for completion of hydrogen consumption. After a total of 13 hours at 120°C. and 300 psig. hydrogen, the autoclave was cooled, vented, purged with nitrogen and discharged. The product obtained was identical to the product obtained in Example 1.

EXAMPLE 3

Into a one liter stainless steel rocker bomb was charged 666 gms. of vinyl pyrrolidone dimer (92% pure) and 6.7 gms. of 5% palladium-on-carbon catalyst. After purging with nitrogen and hydrogen, the bomb was heated to 80°C. and rocked at 80°C. and 100 psig. of hydrogen. Absorption of hydrogen was complete after 4 hours. After a total of 8 hours, the bomb was cooled, vented, purged and discharged. The product was separated by filtration with a suction filter yielding a clear brown liquid which assayed as 92% hydrogenated vinyl pyrrolidone dimer.

EXAMPLE 4

Into a one liter stainless steel rocker bomb was charged 500 gms. of vinyl pyrrolidone dimer (83% pure) and 10.0 gms. of 65% cobalt-on-kieselguhr catalyst. The hydrogenation required 16 hours for completion at 140°C. and 2,000 psig. of hydrogen. After a total of 20 hours, the reactor was cooled, vented, purged and discharged. The product was separated by filtration with a suction funnel giving a clear amber liquid assaying as 82% hydrogenated vinyl pyrrolidone dimer.

EXAMPLE 5

Into a one liter stainless steel rocker bomb was charged 500 gms. of vinyl pyrrolidone dimer (83% pure) and 5.0 gms. of skeletal nickel catalyst. The hydrogenation reaction required two hours at 110°C. and 300 psig. of hydrogen for completion. After filtration separate the catalyst, the recovered product assayed 80% hydrogenated vinyl pyrrolidone dimer.

EXAMPLE 6

Into a one liter stainless steel rocker bomb was charged 500 gms. of vinyl pyrrolidone dimer (99% pure) and 10.0 gms. of zirconium-promoted 53% nickel-on-kieselguhr catalyst. Hydrogenation was complete after two hours at 120°C. and 300 psig. After filtration separate the catalyst, the product assayed 97% hydrogenated vinyl pyrrolidone dimer.

The following example illustrates the use of the hydrogenated vinyl pyrrolidone dimer as a selective extraction solvent for aromatic hydrocarbons from a mixture of aromatic and non-aromatic hydrocarbons.

EXAMPLE 7

In this example, solutions were prepared of a mixture of heptane and toluene in a 50:50 weight ratio. These solutions were extracted with mixtures of the hydrogenated vinyl pyrrolidone dimer 1,3-bis(2-pyrrolidonyl)butane, and varying amounts of water as shown in Table 1 below.

TABLE 1

| Extractant | Hydrogenated Vinyl Pyrrolidone Dimer (wt %) | $H_2O$ (wt %) |
| --- | --- | --- |
| A | 50 | 0 |
| B | 47.5 | 2.5 |
| C | 45.0 | 5.0 |
| D | 42.5 | 7.5 |
| E | 40.0 | 10.0 |
| F | 37.5 | 12.5 |

A 50/50 (by weight) heptane/toluene mixture was charged to a high shear blender together with an equal amount by weight of extractant. The blender effected intimate contact between the extractant and the heptane/toluene mixture by continuous high shear agitation over a period of 5 minutes. Thereafter, agitation was discontinued and the resulting mixture was allowed to settle into a raffinate phase and an extract phase. The extract phase was separated from the raffinate phase by decantation. Thereafter, both the extract phase and the raffinate phase were subjected to gas chromatographic analysis. The results obtained are summarized in Table 2 below. Thereafter, the toluene was removed from the extract phase by distillation.

TABLE 2

| Extractant | Total Toluene Extracted (% of toluene charged) | Selectivity of extract phase toluene extracted heptane extracted |
| --- | --- | --- |
| A | 59.2 | 3.32 |
| B | 38.3 | 4.84 |
| C | 25.2 | 8.21 |
| D | 25.7 | 9.40 |
| E | 11.4 | 11.2 |
| F | 10.0 | 7.29 |

It can be seen that as the amount of water increased in the extractant, the total amount of toluene extracted decreased; however, the selectivity of the extract phase for toluene extraction passed through a maximum around about 10% water. This example also demonstrates the surprisingly high selectivity of the hydrogenated vinyl pyrrolidone dimer for separating aromatic hydrocarbons from mixtures of aromatic/non-aromatic hydrocarbons.

EXAMPLE 8

In this example, solutions were prepared of a mixture of heptane and toluene in a 50:50 weight ratio. These solutions were extracted with mixtures of the hydrogenated vinyl pyrrolidone dimer and varying amounts of water and compared with other known extraction solvents containing the same amount of water. Table 3 below summarizes the results obtained and illustrates a significant advantage of the hydrogenated dimer for extraction as compared to other extractants, namely, its relatively high insolubility in aliphatic hydrocarbons. This is especially significant in commercial operation since less extractant is thereby lost through solubility in the raffinate. It can be seen that from 20 to over 250% more extractant is lost to the raffinate with the known extractants as compared with the hydrogenated vinyl pyrrolidone dimer obtained in accordance with the present invention.

TABLE 3

| % $H_2O$ in Extractant | % Extractant A In Raffinate | % Increased Loss of Extractant A to Raffinate vs. C | % Extractant B In Raffinate | % Increased Loss Of Extractant B to Raffinate vs. C | % Extractant C In Raffinate |
| --- | --- | --- | --- | --- | --- |
| 0 | no separate phase | — | 8.6 | 51.9 | 5.7 |
| 2.5 | 11.4 | 256 | 4.6 | 43.7 | 3.2 |
| 5.0 | 4.2 | 200 | 2.5 | 78.5 | 1.4 |
| 10.0 | 0.9 | 80 | 0.6 | 20.0 | 0.5 |

A = N-methylpyrrolidone
B = 1,6-hexamethylenebispyrrolidone
C = Hydrogenated vinyl pyrrolidone dimer Although specific materials and conditions were set forth in the above exemplary processes in making and using the hydrogenated vinyl pyrrolidone dimer of the present invention, these are merely intended as illustrations of the present invention. Various other reaction conditions, aromatic/non-aromatic mixtures and extraction processes such as those listed above can be substituted in the examples with similar results.

Other modifications of the present invention will occur to those skilled in the art upon a reading of the present disclosure. These are intended to be included within the scope of this invention.

What is claimed is:

1. A process for the preparation of 1,3-bis(2-pyrrolidonyl) butane comprising contacting 1,3-bis(2-pyrrolidonyl)-1-butene at a temperature above the melting point thereof and between about 60°C and about 160°C with hydrogen and a nickel hydrogenation catalyst at a pressure between about 100 and about 5,000 PSIG to thereby hydrogenate 1,3-bis(2-pyrrolidonyl)-1-butene to 1,3-bis(2-pyrrolidonyl) butane, the amount of catalyst employed ranging from about 0.1% to about 10% by weight based on weight of the vinyl pyrrolidone dimer and thereafter recovering the hydrogenated product.

2. A process as defined in claim 1 wherein the hydrogenated product is recovered from admixture with catalyst by filtration.

3. The process of claim 1 wherein the catalyst comprises Raney nickel.

4. The process of claim 1 wherein the catalyst is supported on a base comprising silica, alumina, kieselguhr or mixtures thereof.

* * * * *